United States Patent
Gertzmann et al.

(10) Patent No.: US 6,831,126 B2
(45) Date of Patent: Dec. 14, 2004

(54) EMULSION POLYMERS AND THEIR USE AS PEELABLE COATINGS

(75) Inventors: Rolf Gertzmann, Leverkusen (DE); Joachim Petzoldt, Monheim (DE); Heino Müller, Leverkusen (DE); Christoph Irle, Barcelona (ES)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/289,806

(22) Filed: Nov. 7, 2002

(65) Prior Publication Data

US 2003/0094592 A1 May 22, 2003

(30) Foreign Application Priority Data

Nov. 12, 2001 (DE) .......................................... 101 55 184

(51) Int. Cl.[7] .............................................. C08L 75/06
(52) U.S. Cl. ...................... 524/501; 524/507; 524/502; 524/522; 524/523; 524/533; 524/558; 524/575; 523/334; 523/426
(58) Field of Search ................................. 524/501, 507, 524/502, 503, 523, 533, 558, 575; 523/334, 426

(56) References Cited

U.S. PATENT DOCUMENTS

| 5,006,413 | A | * | 4/1991 | Den Hartog et al. | 428/463 |
|---|---|---|---|---|---|
| 5,204,404 | A | * | 4/1993 | Werner, Jr. et al. | 524/501 |
| 5,716,667 | A | | 2/1998 | Kashiwada et al. | 427/156 |
| 5,891,261 | A | | 4/1999 | Mizukawa et al. | 134/19 |
| 6,025,031 | A | * | 2/2000 | Lettmann et al. | 427/388.4 |
| 6,384,131 | B1 | * | 5/2002 | Kinney et al. | 524/591 |
| 6,448,326 | B1 | * | 9/2002 | Mayer et al. | 524/507 |
| 2001/0029279 | A1 | * | 10/2001 | Muller et al. | 524/501 |

FOREIGN PATENT DOCUMENTS

| DE | 196 52 728 | 6/1997 |
|---|---|---|
| DE | 196 21 037 | 11/1997 |
| DE | 196 49 263 | 1/1998 |
| DE | 197 36 535 | 1/1999 |
| EP | 0 421 609 | 4/1991 |
| EP | 1 072 652 | 1/2001 |
| GB | 1327030 | 8/1973 |

* cited by examiner

*Primary Examiner*—David W. Wu
*Assistant Examiner*—Satya B Sastri
(74) *Attorney, Agent, or Firm*—Joseph C. Gil; Thomas W. Roy; Gary F. Matz

(57) ABSTRACT

The present invention relates to aqueous coating compositions containing

A) at least one aqueous emulsion polymer,
B) one or more polymer dispersions as a dispersion medium,
C) at least one pigment,
D) optionally a neutralizing agent and
E) optionally a coatings additive.

The present invention also relates to a process for preparing these aqueous coating compositions by preparing a dispersion paste by mixing components B), C) and D) with some of component E) and then component A) and the remainder of component E) are homogeneously blended with the dispersion paste.

The present invention further relates to peelable coatings prepared from these coating compositions for the temporary protection of surfaces.

10 Claims, No Drawings

EMULSION POLYMERS AND THEIR USE AS PEELABLE COATINGS

FIELD OF THE INVENTION

The present invention relates to aqueous coating compositions, a process for their preparation and their use as peelable coatings for the temporary protection of surfaces.

BACKGROUND OF THE INVENTION

Aqueous coatings for the temporary protection of high-quality products, such as glass, metal and plastics, from mechanical damage or the effects of the environment are known. This applies in particular to the protection of motor vehicles, electronic equipment and furniture.

When producing motor vehicles, the systems used can be divided into three classes, depending on the type of handling, i.e., the type of application and removal of the temporary protection. One class is wax preservatives; however, a solvent-containing system has to be used to remove the coating and, thus, can lead to damage of the surface being protected as well as to severe ecological pollution. Another class is protective films which can be pulled off in a simple manner, but have to be applied in a very expensive manual process. The third class is aqueous, solvent-free dispersions which are applied with rollers or by spraying and then made into a film. The resulting continuous film can be pulled off in a simple manner, as a cohesive film, and then recycled or incinerated.

EP-A 1 072 652 discloses recyclable systems containing a mixture of at least two different aqueous solvent-free polyurethane dispersions.

DE-A 196 49 263 describes coatings which are suitable for the protection of high-quality goods, in particular lacquer surfaces. A mixture of two emulsion polymers is used; one is a (meth)acrylate copolymer and the other is an ethene/vinylacetate copolymer. The disadvantages are that when preparing the coating composition 1) two components have to be mixed, which means an additional process step, and 2) the use of ethene to prepare the copolymer requires expensive production equipment.

A process for the temporary protection of surfaces by polymer layers is also disclosed in DE-A 196 21 037. The olefinic copolymers used therein are preferably prepared by high-pressure polymerization, which again requires high technical investment.

DE-A 196 52 728 describes a process for applying removable transport protection by using aqueous dispersions, in particular poly(meth)acrylate or polyvinylacetate dispersions. The plastics films described, however, do not have adequate resistance to weathering.

GB 1,327,030 describes the use of acrylonitrile-containing terpolymers for producing peelable films. The use of acrylonitrile in polymers, however, is undesirable for ecological reasons.

U.S. Pat. No. 5,716,667 discloses a process for the temporary protection of car bodies in which a peelable aqueous coating composition is used which contains emulsion polymers of (meth)acrylates and UV absorbers. The ability to peel the cured films away from the substrate is achieved by adding cost-intensive, water repellent components such as silicones, fluorinated hydrocarbons or waxes to the binder.

An object of the present invention is to provide aqueous coating compositions for the temporary protection of items, which have improved weather resistance and peelability, may be prepared from simple-to-obtain and cost-effective starting materials and do not have the disadvantages described in the prior art.

It has been found according to the present invention that coating compositions based on a combination of two polymer dispersions, wherein one is suitable for use as a dispersion medium for pigments, ensure improved weather resistance and peelability of the lacquers.

SUMMARY OF THE INVENTION

The present invention relates to aqueous coating compositions containing

A) at least one aqueous emulsion polymer,
B) one or more polymer dispersions as a dispersion medium,
C) at least one pigment,
D) optionally a neutralizing agent and
E) optionally a coatings additive.

The present invention also relates to a process for preparing these aqueous coating compositions by preparing a dispersion paste by mixing components B), C) and D) with some of component E) and then component A) and the remainder of component E) are homogeneously blended with the dispersion paste.

The present invention further relates to peelable coatings prepared from these coating compositions for the temporary protection of surfaces.

DETAILED DESCRIPTION OF THE INVENTION

The aqueous coating compositions according to the invention preferably contain (I) 48 to 88 wt. %, more preferably 54 to 75 wt. % and most preferably 62 to 70 wt. %, of component A),
(II) 2 to 20 wt. %, more preferably 5 to 15 wt. % and most preferably 7 to 12 wt. %, of component B),
(III) 10 to 50 wt. %, more preferably 15 to 40 wt. % and most preferably 20 to 30 wt. %, of component C),
(IV) 0 to 1 wt. %, more preferably 0 to 0.8 wt. % and most preferably 0.1 to 0.6 wt. %, of component D),
(V) 0 to 4 wt. %, more preferably 0.1 to 2 wt. % and most preferably 0.15 to 1.2 wt. %, of component E), wherein the percentages are based on the resins solids content of the coating compositions and the percentages of components I) to V) add up to 100 wt. %.

Aqueous emulsion polymer A) is prepared from at least three different olefinically unsaturated monomers (a1), (a2) and (a3). Component A) can be prepared by the copolymerization of acrylates (a1), methacrylates (a2), carboxyl group-containing polymerizable monomers (a3) and optionally other polymerizable unsaturated monomers (a4).

The glass transition temperature of emulsion polymer A) is between 0° C. and 35° C., preferably between 10° C. and 25° C.

Emulsion polymer A) preferably contains 65 to 95 wt. %, preferably 79 to 90 wt. % of acrylates (a1) and/or methacrylates (a2), 0.2 to 5 wt. %, preferably 0.5 to 1.5 wt. % of carboxyl group-containing monomers (a3) and 0 to 30 wt. %, preferably 7 to 20 wt. % of other polymerizable unsaturated monomers (a4), wherein all percentages are based on resin solids and add to 100 wt. %.

The weight average of the molecular weight (Mw) of emulsion polymer A) is at least 200,000 g/mol, preferably at least 350,000 g/mol and more preferably at least 500,000 g/mol.

Suitable monomers (a1) and (a2) include esters of acrylic (a1) and methacrylic (a2) acid. Also suitable are monomers which contain functional groups (e.g. hydroxyl or carbonyl groups), such as hydroxyethyl, hydroxypropyl and hydroxybutyl acrylate or methacrylate and acetoxyethyl methacrylate. It is also possible to use non-ionic hydrophilic acrylates (a1) and methacrylates (a2), such as methoxypolyethyleneglycol acrylate or methacrylate. Other suitable monomers include bis-acrylates (a1) or bis-methacrylates (a2), such as hexanediol diacrylate or dimethacrylate, ethyleneglycol dimethacrylates, oligo- and poly-ethyleneglycol dimethacrylates. Preferred monomers are $C_1$–$C_{10}$-alkyl esters and $C_5$–$C_{10}$-cycloalkyl esters of acrylic (a1) and methacrylic (a2) acid, such as methyl, ethyl, n-propyl, iso-propyl, n-butyl, iso-butyl, tert.-butyl, hexyl, cyclohexyl, isobornyl and 2-ethylhexyl acrylate (a1) and methacrylate (a2). Mixtures of the preceding monomers are also suitable.

Suitable monomers (a3) include carboxyl group-containing monomers, such as itaconic, maleic and fumaric acids, and monoesters of unsaturated $C_4$–$C_8$ dicarboxylic acids. Acrylic and/or methacrylic acid are preferably used as component (a3). Mixtures of the preceding monomers are also suitable.

Suitable polymerizable monomers (a4) include vinyl esters, vinyl chloride, vinyl methyl ether, vinyl isobutyl ether, 2-ethylhexyl vinyl ether, acrylamide, methacrylamide and monomers that contain different ionic groups from (a3), such as 2-acrylamido-2-methylpropanesulfonic acid. Preferred monomers (a4) are styrene, methylstyrene, vinyltoluene and divinylbenzene. Styrene is more preferred.

Polymers A) and methods for preparing them are known in the art. They can be prepared by conventional emulsion polymerization processes such as those described, for example, in Houben-Weyl, Methoden der org. Chemie, vol. E 20/I, Makromolekulare Stoffe, Georg Thieme Verlag, Stuttgart, 1987.

Ionic emulsifiers, such as the emulsifier Agitan® 951 (Bayer AG, Leverkusen), are preferably used for preparing emulsion polymer A). ¼ to ½ of the total amount of emulsifier is initially introduced with water and the rest of the emulsifier is added during polymerization in parallel with the addition of monomer. The second portion of emulsifier is mixed with water and a peroxidic initiator, e.g. ammonium persulfate, and added more slowly than the stream of monomer mixture so that at the completion of reaction only an aqueous solution of emulsifier and initiator is being added.

A reduction in the concentration of residual monomer after all the aqueous emulsifier/initiator solution has been added can be achieved in known manner by the subsequent addition of a redox initiator system, e.g. containing an organic peroxide, such as TRIGONOX® AW 70 (70% aqueous solution of tert-butyl hydroperoxide, Akzo Nobel, Düren, Germany), ammonium persulfate, Fe(II) salts, TRILON® B (tetrasodium salt of ethylenediaminetetraacetic acid, BASF AG, Ludwigshafen) and RONGALIT® C (sodium formaldehyde sulfoxylate, BASF AG, Ludwigshafen) (see e.g. Römp Lexikon Chemie, Georg Thieme Verlag, 1999, Stuttgart/New York).

The pH of emulsion polymer A) can be adjusted to a pH of 6 to 9, preferably 7 to 8, at this point or later, by adding base(s). Suitable base(s) include alkaline organic and/or alkaline inorganic compounds. In addition to an aqueous ammonia solution, volatile primary secondary and tertiary amines are preferred.

Component B) has an acid value, based on resin solids, of 7 to 75 mg KOH/g and acts as a dispersion medium for components C), D) and E). Aqueous secondary dispersions, which preferably contain no solvent, are suitable for use as component B). Secondary dispersions are those polymers in which the polymer already present is dispersed in a second process step. Examples of secondary dispersions are acrylic, alkyd, epoxide and polyester resins and polyurethane resins (e.g. Römp Lexikon, Lacke und Farben, 10th ed., p. 150).

Suitable polyester acrylate dispersions are described, for example, in EP-A 0 543 228 at column 14, line 53 to column 15, line 22 (U.S. Pat. No. 5,336,711, herein incorporated by reference); and polyacrylate dispersions are described, for example, in EP-A 0 358 979 at page 6, line 50 to page 7, line 57 (U.S. Pat. No. 5,075,370, herein incorporated by reference). Solvent-free polyurethane/polyacrylate hybrid dispersions such as those described in EP-A 0 189 945 at page 23, example VIII (U.S. Pat. No. 4,644,030, herein incorporated by reference) are preferred, as well as emulsion polymers with a carboxyl group content [calculated as COOH, MW=45.01 g/mol], based on resin solids, of between 0 and 6 wt. %, preferably between 1 and 5 wt. % and more preferably between 1.5 and 4 wt. %, which can be obtained using a conventional emulsion polymerization process (e.g. in Houben-Weyl, Methoden der org. Chemie, vol. E 20/I, Makromolekulare Stoffe, Georg Thieme Verlag Stuttgart, 1987).

Emulsion polymers B) have glass transition temperatures between 35° C. and 105° C., preferably between 35° C. and 80° C.

Also preferred as polymers B) are solvent-free polyurethane dispersions which are prepared by the acetone or melt dispersion process and are described in Houben-Weyl, Methoden der org. Chemie, vol. E 20, 1987, pages 1659 to 1681. Combinations of polyurethanes with higher and lower amounts of plasticizer are more preferred. Mixtures of different types of dispersions may also be used.

Any pigments known from coatings chemistry are suitable as component C). Examples of suitable pigments include titanium dioxides and zinc oxides. The pigments are generally surface-modified in order to ensure compatibility with the binders.

Alkaline organic and/or alkaline inorganic compounds are suitable as neutralizing agents D). Also preferred in addition to aqueous ammonia solutions are volatile primary, secondary and tertiary amines, such as ethylamine, dimethylamine, dimethylethanolamine, triethylamine, morpholine, piperidine, diethanolamine, triethanolamine, diisopropylamine, 2-amino-2-methylpropanol, 2-N,N-dimethylamino-2-methylpropanol and mixtures of these compounds.

Suitable additives E) include known coatings additives which are able to exert a positive effect on the applicability, the flow, the capacity to wet a substrate, the stability and the optical properties of the coating. Anti-settling agents, wetting agents and thickeners are preferred as component E). Suitable thickeners include natural organic thickeners, e.g. dextrins or starches; organically modified natural substances, e.g. cellulose ethers or hydroxyethyl cellulose; organic fully synthetic polymers, e.g. poly(meth)acrylic compounds or polyurethanes; and inorganic thickeners, e.g. bentonites or silicas. Organic fully synthetic thickeners are preferably used. Acrylate thickeners, which are optionally diluted further with water before adding, are more preferably used. Preferred wetting agents are silicone-free.

The present invention also provides a process for preparing the aqueous coating compositions according to the invention by first preparing a dispersion paste by mixing components B), C) and D) with some of component E) and then component A) and the remainder of component E) are homogeneously blended with the dispersion paste. In the process according to the invention, the dispersion paste is preferably prepared with the aid of a commercially available pearl mill.

In a preferred embodiment of the process according to the invention, preparation takes place by mixing component B) with ⅕th to ¹⁄₂₀th of the total amount of component D), then adding a commercially available silicone-free substrate wetting agent (component E) and a commercially available anti-settling agent (component E) and a pigment (component C). Component B) acts as the dispersion medium for component C). This mixture is then milled, e.g. in suitable dispersion equipment, such as a pearl mill, down to a particle size of 5 to 30 µm, preferably 10 to 15 µm.

Then the dispersion paste is intimately mixed with the entire amount of component A), the remaining amount of component D) and one or more commercially available thickeners (component E). The amount of thickener is chosen in such a way that a coating viscosity of 1 to 500 Pa.s at $D=0.1$ $s^{-1}$ and 0.01 to 0.5 Pa.s at $D=10^4$ $s^{-1}$, preferably 2 to 400 Pa.s at $D=0.1$ $s^{-1}$ and 0.05 to 0.4 Pa.s at $D=10^4$ $s^{-1}$ and more preferably 3 to 300 Pa.s at $D=0.1$ $s^{-1}$ and 0.08 to 0.3 Pa.s at $D=10^4$ $s^{-1}$ is achieved.

The pH of coating compositions according to the invention is between 7.5 and 10, preferably between 8 and 9.

Before further processing, the coating composition is stored at room temperature for 10 to 36 h, preferably 12 to 30 h and more preferably 18 to 24 h.

The aqueous coating compositions according to the invention can be applied by the known methods of coatings technology, such as by dipping, spreading, pouring, spraying, sprinkling, or with brushes or rollers, and are then dried at 20° C. to 150° C. The coating is preferably applied using an airless spray unit.

The peelable coatings prepared from the coating compositions according to the invention are weather-resistant, solvent-free, easy to peel off and sufficiently extensible.

Suitable substrates for the application of peelable coatings include glass; metals such as aluminium, high-gloss chrome-plated items and stainless steel; and plastics such as polycarbonates, polyacrylates, polyesters, polyvinylchlorides, polystyrenes and polyurethanes. Preferred substrates are coated surfaces. More preferably, the substrates to be coated with coating compositions according to the invention are the coated surfaces of motor vehicles.

The invention is further illustrated but is not intended to be limited by the following examples in which all parts and percentages are by weight unless otherwise specified.

EXAMPLES

The following GPC equipment (calibrated with a polystyrene standard) was used to determine the molecular weight.

Pump: Hewlett Packard 1100
Injector: Hewlett Packard 1100
Detector 1: Kontron 240 nm
Detector 2: Hewlett Packard RI 1047A
Columns: 1. Nucleogel GPC 106-10 300×7.8 mm; Macherey-Nagel
2. Nucleogel GPC 104-10 300×7.8 mm; Macherey-Nagel
3. Nucleogel GPC 500-10 300×7.8 mm; Macherey-Nagel
4. Nucleogel GPC 100-10 300×7.8 mm; Macherey-Nagel
Eluant: Tetrahydrofuran
Flow rate: 0.6 ml/min
Pressure: about 70 bar A) Preparation of Component A Example 1

1670 g of demineralized water and 28 g of emulsifier AGITAN® 951 (ionic non-reactive-emulsifier, 80% strength solution in water, Bayer AG, Leverkusen, Germany) were homogeneously mixed together at 75° C. in a 4 liter, 4-necked flask. Then 150 g of a mixture of 53.7 g of methyl methacrylate, 20.6 g of styrene, 74.2 g of butyl acrylate and 1.5 g of acrylic acid were added to the solution over a period of 5 min and stirred for a further 5 min before a mixture of 1.0 g of ammonium peroxodisulfate in 29 g of demineralized water was added to the initial mix (10% of the total amount of monomers) over a period of 5 min. When addition was complete, the mixture was stirred for 15 min at 75° C. and then a mixture of 483.3 g of methyl methacrylate, 185.1 g of styrene, 668.4 g of butyl acrylate and 13.5 g of acrylic acid was added over a period of 3 h. At the same time, 150 g of a 1% strength aqueous ammonium peroxodisulfate solution was added over a period of 3.5 h. After addition was complete, stirring was continued for a further 60 min at 75° C. before the emulsion was cooled to 50° C. and 50% strength aqueous solutions of each of 20 g of TRILON® B (Na salt of EDTA, BASF, Ludwigshafen, Germany) solution, 16 g of TRIGONOX® AW 70 (70% aqueous solution of tert-butyl hydroperoxide, Akzo Nobel Chem. GmbH, Düren, Germany) and 11 g of RONGALIT® C (sodium formaldehyde sulfoxylate, BASF AG, Ludwigshafen, Germany) were added in sequence within 3 min. When addition was complete, the mixture was stirred for a further 60 min at 50° C. before the emulsion was cooled to 25° C. and the pH was adjusted to 7.9 using a 10% strength aqueous solution of ammonia.

The emulsion had the following properties:

| | |
|---|---|
| pH (10% solution) | 7.9 |
| Viscosity | 140 m Pa s (D = 50 $s^{-1}$) |
| Solids content | 44.2% |
| Average particle size (LKS) | 76 nm |
| $T_g$ (calculated) | 14° C. |
| $M_w$ (GPC) | 650,000 g/mol |

Additional emulsion polymers with different acrylate compositions were prepared using the process specified in example 1. The various monomer compositions (examples 2–5, according to the invention) are listed in table 1.

TABLE 1

| | Examples 2 to 5, according to the invention | | | |
|---|---|---|---|---|
| | Ex. 2 | Ex. 3 | Ex. 4 | Ex. 5 |
| Methyl methacrylate | 49.5 wt. % | 42.1 wt. % | 49.9 wt. % | 25.3 wt. % |
| Butyl acrylate | 49.5 wt. % | 49.5 wt. % | 35.5 wt. % | 60.0 wt. % |
| Styrene | — | 7.4 wt. % | 13.7 wt. % | 13.7 wt. % |
| Acrylic acid | 1.0 wt. % | 1.0 wt. % | 1.0 wt. % | 1.0 wt. % |
| pH (10% soln.) | 7.7 | 8.1 | 7.5 | 7.8 |
| Viscosity [mPas] (D = 50 $s^{-1}$) | 14 | 12 | 317 | 60 |
| Solids content [%] | 45 | 40 | 44 | 43 |

TABLE 1-continued

Examples 2 to 5, according to the invention

| | Ex. 2 | Ex. 3 | Ex. 4 | Ex. 5 |
|---|---|---|---|---|
| Average particle size [nm] | 63 | 61 | 79 | 84 |
| $T_g$ (calculated) [° C.] | 13.7 | 13.8 | 35.0 | −0.1 |
| $M_w$ (GPC) [g/mol] | 600,000 | 580,000 | 630,000 | 580,000 |

Example 6 (Comparison Example)

Preparation of an emulsion polymer according to U.S. Pat. No. 5,716,667, example [A-1]. Polymerization was based on the description of example [A1] in the patent application mentioned above.

The ionic emulsifier NEWCOL® 707SF (polyoxyalkylene surfactant, Nippon Nyukazai. Co. Ltd.) used in the application was replaced by the ionic emulsifier Agitan® 951 (Bayer AG, Leverkusen, Germany).

312 g of demineralized water and 0.7 of emulsifier AGITAN® 951 (ionic non-reactive emulsifier, 80% strength solution in water, Bayer AG, Leverkusen) were homogeneously mixed together at 80° C. under an atmosphere of nitrogen in a 2 liter, 4-necked flask equipped with thermometer, dropping funnel, reflux condenser and stirrer. Then 0.2 g of ammonium persulfate were added at 80° C., immediately before addition of the pre-emulsion, which was added dropwise over a period of 3 h and contained 350 g of demineralized water, 440 g of methyl methacrylate 352 g of n-butyl acrylate, 8.0 g of acrylic acid and 0.7 g of ammonium persulfate. Thirty minutes after complete addition, 0.4 g of ammonium persulfate dissolved in 7 g of demineralized water were added over a period of 30 min and the mixture was stirred for a further 2 h at 80° C. Then the mixture was cooled to 30° C., the pH was adjusted to 7.9 using a 25% strength aqueous solution of ammonia, and then cooled to RT.

The emulsion had the following properties:

| | |
|---|---|
| pH (10% solution) | 7.9 |
| Viscosity | 55 m Pa s (D = 50 s$^{-1}$) |
| Solids content | 53.0% |
| Average particle size (LKS) | 124 nm |
| $T_g$ (calculated) | 21.6° C. |
| $M_w$ (GPC) | 152,000 g/mol |

B) Preparation of Component B
B.1) Polyurethane Dispersions

Example 7

A polyurethane dispersion was prepared as described in EP-A 1 072 652 (copending application, U.S. Ser. No. 09/628,875), example 1 (dispersion UA).

170 g (0.1 mol) of a polyester prepared from adipic acid, 1,6-hexanediol and neopentyl glycol and having a number average molecular weight of 1,700 g/mol and 2 wt. % of OH were dewatered in a reaction vessel for 30 minutes at 120° C. and 10 mbar with stirring. 13.4 g (0.1 mol) of dimethylolpropionic acid and 111 g (0.5 mol) of isophorone diisocyanate were introduced under nitrogen. After a reaction time of 1 h at 110° C., the mixture was cooled to 60° C. and dissolved in 100 g of acetone. After adding 18 g (0.2 mol) of 1,4-butanediol, stirring was continued for a further 22 h at 50° C. The NCO content was 1.60% (calculated, 2.04%). The mixture was diluted with 500 g of acetone. A mixture of 10.6 g (0.062 mol) of isophorone diamine, 1.07 g (0.016 mol) of a 25% ammonia solution and 60 g of water were added to the NCO prepolymer at 50° C. Then stirring was continued for a further 5 h at 50° C. The mixture was neutralized with 3.4 g (0.05 mol) of 25% ammonia solution and dispersed with 450 g of water. The acetone was removed at 50° C. and 150 mbar and a white dispersion with a solids content of 38.8% was obtained. The degree of neutralization was 50%.

Example 8

A polyurethane dispersion was prepared as described in EP-A 1 072 652 (copending application, U.S. Ser. No. 09/628,875), example 6 (dispersion UB).

60 g (0.035 mol) of a polyester prepared from adipic acid, 1,6-hexanediol and neopentyl glycol (molar ratio of glycols 67:33) and having a number average molecular weight of 1,700 g/mol, 90.5 g (0.108 mol) of a polyester prepared from adipic acid and 1,6-hexanediol and having a number average molecular weight of 840 g/mol and 17.8 g of a polyether prepared from n-butanol, 83% ethylene oxide and 17% propylene oxide and having a number average molecular weight of 2240 g/mol were dewatered for 30 min in a reaction vessel at 120° C. and 15 mbar with stirring. 20.75 g (0.155 mol) of dimethylolpropionic acid were introduced under nitrogen and 192 g (0.86 mol) of isophorone diisocyanate were added at 75° C. in one portion. After a reaction time of 3 h at 75° C., 13.25 g (0.147 mol) of 1,4-butanediol and 5.25 g (0.04 mol) of trimethylolpropane were added to the mixture. After stirring for a further 3.5 h, the NCO content was 7.50% (calculated, 7.51%). The prepolymer was diluted with 992 g of acetone. A mixture of 16.3 g (0.27 mol) of ethylenediamine, 20.2 g (0.12 mol) of a 9.7% strength ammonia solution and 200 g of water were added to the NCO prepolymer at 50° C. Stirring was then continued for 5 h at 50° C. and the mixture was neutralized with a solution of 13.6 g (0.078 mol) of a 9.7% strength ammonia solution and 10 g of water. After stirring for a further 15 min, the mixture was dispersed by adding 525 g of water. The acetone was removed at 50° C. and 150 mbar and a white dispersion with a solids content of 35% was obtained. The degree of neutralization was 50%.

B.2) Emulsion Polymer

Example 9

A solution of 2.0 g of emulsifier AGITAN® 951 (ionic non-reactive emulsifier, 80% strength in water, Bayer AG, Leverkusen), 98.8 g of SYNPERONIC® PE/L 61 (non-ionic surfactant, Uniquema, Everberg, Belgium) and 2167 g of distilled water were initially introduced into a 6 liter reactor which was provided with a stirrer and heated to an internal temperature of 80° C. Then solution 1) containing 35.2 g of hydroxypropyl methacrylate, 142.3 g of styrene, 20.2 g of n-butyl acrylate and 6.2 g of acrylic acid was pumped into the autoclave within about 15 min. At the same time, solution 2) containing 1.0 g of ammonium peroxodisulfate and 53.3 g of distilled water was added. The mixture was then stirred for 30 min at the preset internal temperature of 80° C. Then solution 3), which contained 316.4 g of hydroxypropyl methacrylate, 1280.4 g of styrene, 181.6 g of n-butyl acrylate and 56.2 g of acrylic acid, and solution 4), which contained 6.2 g of ammonium peroxodisulfate, 50.0 g of emulsifier AGITAN® 951 (ionic non-reactive emulsifier, 80% strength) and 321.0 g of distilled water, each under an atmosphere of nitrogen, were pumped in uniformly and simultaneously over a period of 6 h. Stirring was then continued for a further 2 h. Post-activation was performed using initiator solution 5), which contained 1.0 g of ammonium peroxodisulfate and 53.5 g of distilled water. Stirring was continued for 4 h and then the mixture was cooled to an internal temperature of less than 30° C. The mixture was then neutralized with 27.0 g of an aqueous ammonia solution (25% strength) in 187 g of water. The neutralization solution was pumped into the contents of the autoclave within about 10 min. with stirring.

The product had the following properties:

| | |
|---|---|
| Solids content | 43.5 wt. % |
| pH | 8.3 |
| Viscosity at D = 45.4 s$^{-1}$ and 23° C. | 39 mPa*s |
| Average particle diameter (LKS) | 139 nm |

C) Preparing the Coating Composition According to the Invention 20.369 g of a dispersion paste was milled for 30 min to a particle size of 10 μm in a commercially available pearl mill and briefly aged at 60° C. for about 3 h. The dispersion paste contained 8.990 g of a 38% strength polyurethane dispersion UA (example 7), 2.430 g of a 35% strength polyurethane dispersion UB (example 8), 0.041 g of a 90% strength aqueous solution of 2-amino-2-methyl-1-propanol, 0.101 g of a conventional commercial silicone-free substrate wetting agent (HYDROPALAT® 110, Cognis & Inks, Düsseldorf, Germany), 0.064 g of an anti-settling agent (AEROSIL® R 972, Degussa, Germany) and 8.750 g of titanium dioxide (TRONOX® R-KB-4, Kerr McGee Pigments GmbH & Co. KG, Krefeld, Germany). The dispersion paste was intimately mixed with 69.200 g of the polyacrylate dispersion from example 1, 0.260 g of 90% strength 2-amino-2-methyl-1-propanol in water and 1.040 g of a 1:1 mixture of a 30% strength commercially available acrylate thickener (ACRYSOL® DR 73, Rohm & Hass Company, Frankfurt, Germany) and distilled water, and stored for 24 h at room temperature before further processing.

D) Comparison: Preparation of a Coating without Component B

The lacquer was prepared with the aid of a dissolver for dispersing purposes, but without using components B).

87.468 g of the 53% strength polyacrylate dispersion from example 6 were premixed with 0.245 g of a conventional commercial wetting agent (TEGOWET® 250, Tego Chemie Service GmbH—Degussa, Essen, Germany), 0.464 g of UV absorber (TINUVIN® 1130, Ciba Spezialitäten Chemie, Lamperthiem, Germany), 0.233 g of water-dilutable commercially available HALS (hindered amine light stabilizers) additive (SANDUVOR® 3055, Clariant Huningue, France) were premixed and 6.0 g of titanium dioxide (TRONOX® R-KB-4, Kerr McGee Pigments GmbH & Co. KG, Krefeld, Germany) were then added with stirring and using a dissolver. The 6.0 g of titanium dioxide corresponds to the maximum amount which can be processed using the formulation described above. This was only 50% of the amount of TiO$_2$ processed in Example C.

E) Applying the Coating

The coatings according to the invention and the comparison coating were applied to the substrates using a spreader (210 μm). In addition to glass, a panel from the Audi Co. coated with a commercially available two-component polyurethane clear coating, from a mass-production coating run, was also used in the tests as a substrate for the peelable coating.

F) Properties of the Coatings Obtained

The properties of the coatings given in table 2 were obtained with the particular emulsion polymers set forth.

TABLE 2

| | Example | | | | | | | |
|---|---|---|---|---|---|---|---|---|
| | 10 | 11 | 12 | 13 - comp | 14 - comp | 15 | 16 - comp | 17 |
| Binder from example | 1 | 1 | 1 | 6 | 6 | 6 | 2 | 2 |
| Parts by wt. of component B | 3.7 ex. 7/ 1 ex. 8 | 3.7 ex. 7/ 1 ex. 8 | 4.7 ex. 9 | — | — | 3.7 ex. 7/ 1 ex. 8 | — | 3.7 ex. 7/ 1 ex. 8 |
| HALS | — | Tinuvin | Tinuvin | Tinuvin | Tinuvin | Tinuvin | Tinuvin | Tinuvin |
| UV absorber | — | Sandovur | Sandovur | Sandovur | Sandovur | Sandovur | Sandovur | Sandovur |
| TiO$_2$ on BM | 25% | 25% | 25% | — | 12% | 25% | — | 25% |
| Viscosity [Pa × s] at | | | | | | | | |
| D = 0.1 s$^{-1}$ | 19.33 | 19.4 | 14.40 | 2.7 | 1.6 | 1.2 | 0.3 | 0.36 |
| D = 10$^4$ s$^{-1}$ | 0.1 | 0.1 | 0.1 | 0.02 | 0.04 | 0.03 | 0.03 | 0.03 |
| Thickness of layer [μm] | 79 | 90 | 57 | 95 | 92 | 85 | 57 | 62 |
| Elongation at break [%] | 350 | 350 | 200 | 75 | 75 | 150 | 350 | 200 |
| Ease of detaching (0 = almost no adhesion; 7 = cannot be detached) | Dried for 10' at 80° C. and 24 h at RT | | | | Dried for 10' at 80° C. and 24 h at RT | | | |
| Glass | 1–2 | 1–2 | 1–2 | 1 | 1 | 1 | 1 | 1 |
| Clear coat (CC) | 1 | 1 | 1 | 1 | 2 | 1 | 1 | 1–2 |
| After 500 h Xeno | | | | | | | | |
| Elongation at break [%]$^{1)}$ | 250 | 300 | 100 | 25 | 75 | 100 | 300 | 150 |
| Ease of detachment from CC | 1 | 1 | 1 | 1 | 1 | 1 | 1–2 | 2 |

TABLE 2-continued

| | Example | | | | | | | |
|---|---|---|---|---|---|---|---|---|
| | 10 | 11 | 12 | 13 - comp | 14 - comp | 15 | 16 - comp | 17 |
| After 1000 h Xeno | | | | | | | | |
| Elongation at break [%]¹⁾ | 250 | 300 | 125 | 25 | 50 | 75 | 125 | 175 |
| Ease of detachment from CC | 1 | 1 | 1–2 | 3–4 | 2 | 1 | 3–4 | 2 |

¹⁾Manual determination on a 15 mm wide and 30 mm long coating film by extending to break point.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous coating composition comprising
   A) at least one aqueous emulsion polymer,
   B) one or more polymer dispersion(s) as a dispersion medium, selected from the group consisting of polyester acrylate dispersions, polyacrylate dispersions, wherein the glass transition temperature of the polymer in the dispersion(s) is between 35° C. and 105° C., polyurethane/polyacrylate hybrid dispersions, and polyester-polyurethane dispersions based on adipic acid, 1.6-hexanediol and neopentylglycol,
   C) at least one pigment,
   D) optionally a neutralizing agent and
   E) optionally a coatings additive.

2. Aqueous coating compositions according to claim 1 containing
   (I) 48 to 88 wt. % of component A),
   (II) 2 to 20 wt. % of component B),
   (III) 10 to 50 wt. % of component C),
   (IV) 0 to 1 wt. % of component p),
   (V) 0 to 4 wt. % of component E),
   wherein the percentages are based on the resin solids content of the coating compositions and the sum of the components is 100 wt. %.

3. The aqueous coating composition of claim 1 wherein the glass transition temperature of emulsion polymer A) is between 0° C. and 35° C.

4. The aqueous coating composition of claim 1 wherein component B) has an acid value of 7 to 75 mg KOH, based on resin solids.

5. The aqueous coating composition of claim 1 wherein component E) comprises an anti-settling agent, a wetting agent or a thickener.

6. The aqueous coating composition of claim 1 wherein aqueous emulsion polymer A) is the reaction product of at least three different olefinically unsaturated monomers.

7. The aqueous coating composition of claim 5 wherein aqueous emulsion polymer A) is the reaction product of an acrylate, a methacrylate, a carboxyl group-containing polymerizable monomer and optionally a different polymerizable unsaturated monomer (a4).

8. The aqueous coating composition of claim 1 wherein aqueous emulsion polymer A) has a weight average molecular weight (Mw) of at least 200,000 g/mol.

9. A process for preparing the aqueous coating composition of claim 1 which comprises first preparing a dispersion paste by mixing components B), C) and D) with a portion of component E) and then homogeneously mixing component A) and the remainder of component E) with the dispersion paste.

10. A peelable coating prepared by applying the aqueous coating composition of claim 1 to a substrate.

* * * * *